July 15, 1952 C. S. BROWN 2,603,451
FLOW CONTROL ASSEMBLY FOR CLOSED HYDRAULIC CONDUITS
Filed Nov. 19, 1947
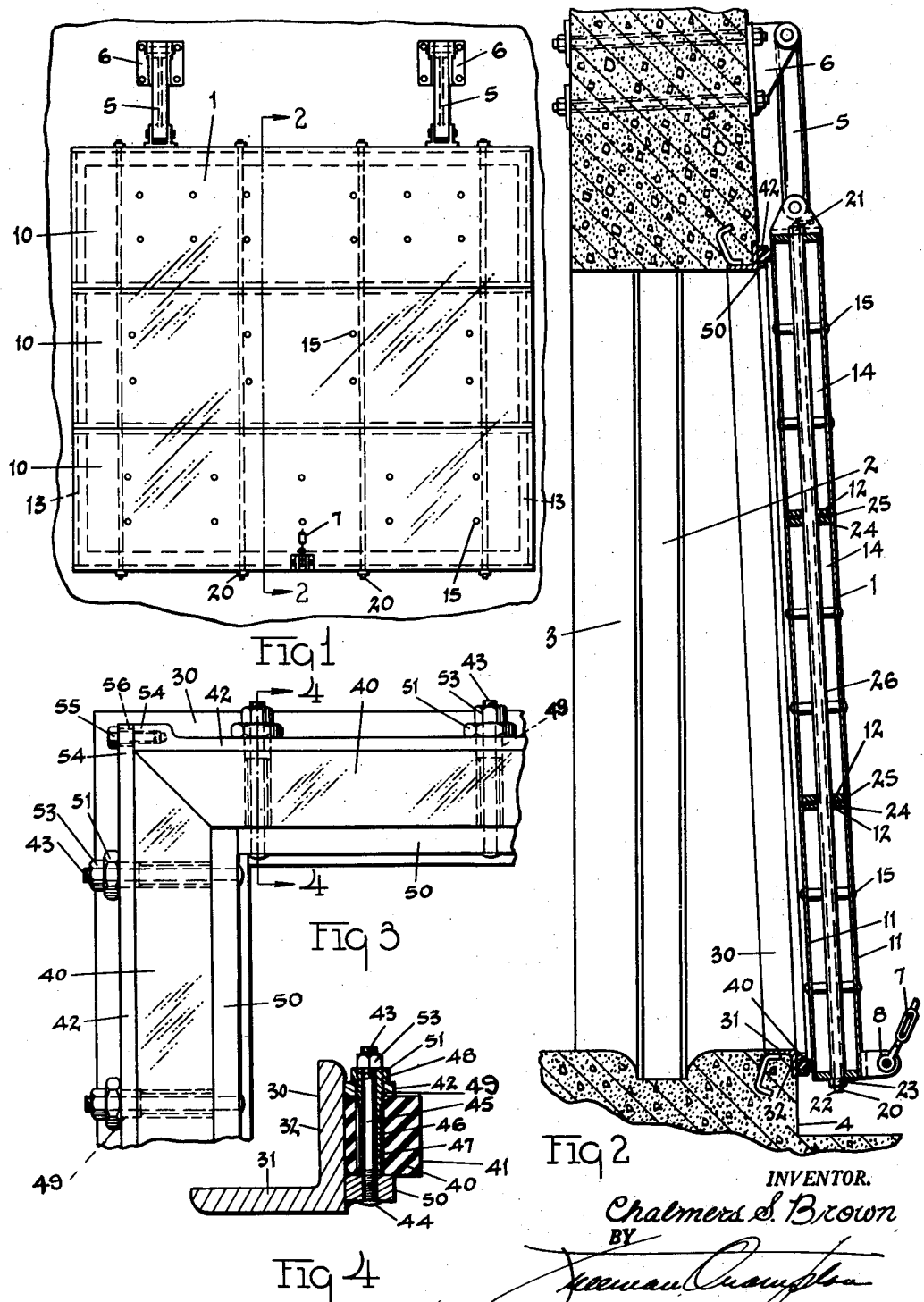
INVENTOR.
Chalmers S. Brown
BY
ATTORNEY Patented July 15, 1952

2,603,451

UNITED STATES PATENT OFFICE 2,603,451

FLOW CONTROL ASSEMBLY FOR CLOSED HYDRAULIC CONDUITS

Chalmers S. Brown, Lima, Ohio

Application November 19, 1947, Serial No. 786,990

12 Claims. (Cl. 251—125)

My invention relates generally to the art of controlling the flow through closed hydraulic conduits, such as the storm or flood water mains of a water disposal system. The invention particularly relates to a flow control assembly construction adapted for use in controlling the direction of flow in such mains, particularly those in which the discharge of the disposal system is subject to conditions of periodic high water as occasioned by tide changes or flood crests, causing back flow through the system.

Prior to my invention it has been the practice in flow control assemblies to provide a water gate or shutter of an integrated structure having lateral dimensions equal to or greater than the conduit whose flow was to be controlled. When such structure becomes leaky, due to rust or chemical decomposition in use, it is necessary to remove the entire gate and replace the same with a new one. Such operation is a major one, costly in labor and material since there is little to be salvaged except in scrap from the old gate. Also, in assemblies of the prior art, the gate or its seating frame becomes warped or bent as a result of impacts delivered against the same by heavy objects carried in the flow through the conduit. When the gate or its seating frame is thus warped, the gate cannot readily seat against the frame, thus leaving an open joint through which water may flow, even though the gate be in a normally closed position. Correction of such condition in assemblies of the prior art requires truing of the warped or bent gate or seat frame. This often requires dismantling of the assembly with its attendant costs and losses of use of assembly. I propose to provide an assembly in which the faults occurring during use may be easily and quickly remedied with but little expense and without loss of use of the assembly in the interim of correction.

The invention has for one of its primary objects to provide a water gate or shutter constructed of a plurality of separable panels, arranged in a common plane and edge to edge relation to extend collectively over lateral dimensions at least equal to the cross-sectional area of the conduit to be controlled, together with means engaging the opposite and outermost panels of the panels adapted to clamp the outermost panels and those panels intermediate the outermost panels together, so that contiguous panel edges mate in flow preventing relation. Thus, my invention provides a flow control gate of sectionalized construction in which sections thereof, having become leaky or damaged in use, may be replaced easily and quickly and the remaining undamaged sections be used to effectively reduce the costs of maintenance of such gate.

The invention has for a particular object, which is corollary to the above outlined primary object, to provide an adjustable means for engaging the opposite and outermost panels whereby the releasement of the panels, as for purposes of substitution, may be easily effected. A further particular and corollary object of the invention is to provide means engaging the opposite and outermost panel which also slidably engages the panels in intermediate relation to said outermost panels to prevent lateral displacement of said intermediate panels with respect to the plane of said outermost panels.

A further particular object of the invention, corollary to the above primary object is to provide gate panels which are hollow water-tight bulkheads and hence light in weight when handled and of a desired buoyance in the medium to be controlled. A further particular object is to provide panels each of which comprises a sheet metal, hollow rectangular parallelepiped of shallow altitude between its bases, one of which is disposed to face upstream of the conduit flow, so that one of its lateral faces of greatest area is disposed in contiguity with a corresponding lateral face of an adjacent panel.

Another primary object of the invention is to provide a hydraulic sealing means, on either the gate or its seat frame which the gate engages when in closed position, by which the joint between the lateral surface portions of the gate and its seat frame may be effectively closed to prevent flow therethrough. The hydraulic sealing means includes a lineally extending and resiliently distortable member mounted so as to register and engage with the surfaces of the conduit perimetric to potential flow therethrough and with the portions of the lateral surface of the gate when the same is in conduit closing position. Said means is characterized from the art prior to my invention by having a plurality of means spaced along the member for exerting an adjustable clamping thereon to distort and bulge the member in zones extending along the length of the member, whereby a gate seating surface of a desired contour may be obtained. Hence, when portions of the gate are not in plane with other portions, such as when the gate has been warped or bent in use, the user may, by operation of said means, cause the resiliently distortable member to be bulged into a seating surface which mates with the warped or bent gate, sealing the joint between the gate and frame when they are in closed relative positions.

It is recognized that prior to my invention, others have used compressible rubber strip to seal the joint between closures and their respective sashes. In such instances, however, the compression forces are applied uniformly and hence variations in bulging to form a desired or predetermined contour are not obtainable. Further, the conforming of the rubber strip in the devices of the prior art is an incident to reaction of the strip against the sash or closure surfaces. To my knowledge, no one prior to my invention has disclosed means for effecting predetermined and zonal distortion or bulging.

A particular object of my invention, corollary to the last mentioned primary object, is to provide a plurality of sets of jaws, each set of jaws operated by a plurality of means for causing the jaws to exert variable degrees of compression on the rubber strip and thereby produce variations in the extent of distortion and bulging of the strip. A still further object of the invention is to provide actuating means for each of said jaw operating means which is individual thereto.

The invention consists in other features and advantages which will appear from the following description and upon examination of the drawings. Structures containing the invention may partake of different forms and still embody the invention. To illustrate a practical application of the invention, I have selected a flow control assembly for closed hydraulic conduits as an example of the various structures and details thereof that contain the invention and shall describe the selected structure hereinafter, it being understood that variations may be made without departing from the spirit of the invention. The particular structure selected is shown in the accompanying drawings and described hereinafter.

Fig. 1 is a view in elevation of the flow control assembly for closed hydraulic conduits embodying my invention, as viewed upstream from a downstream position showing the water gate or shutter in a closed position. Fig. 2 is a view of a section taken along the plane of the line 2—2 indicated in Fig. 1. Fig. 3 illustrates a somewhat enlarged elevation of a portion of the gate seat frame shown in Figs. 1 and 2. Fig. 4 illustrates an enlarged view of a section taken along the plane of the line 4—4 indicated in Fig. 3.

In the drawings, a tide gate 1 is illustrated in flow control relation to a mouthpiece 2 formed on the end of a main 3. The mouthpiece 2 is adapted to discharge into a basin 4, the gate 1 operating to prevent counter back flow from the basin 4 into the main 3.

The tide gate 1 is accordingly pivotally mounted by hinge links 5 connected at its upper edges and pivoted on brackets 6 fixed to the wall of the basin 4. By means of chains 7 attached to eyes 8 mounted on the lower edge of the gate, the gate may be swung on its hinge connection to any desired open position. As shown, the gate 1 permits ready flow outwardly from the main 3 and its mouthpiece 2 into the basin 4 but prevents back flow in a reverse direction, much in the same manner as that of a clapper-type check valve. Generally, the foregoing described arrangement is normal to disposal systems, my invention residing in the structure of the gate and its frame, which I shall now describe.

Broadly speaking, the gate 1 comprises a plurality of panels 10, rectangular in shape and arranged in a common plane in an edge to edge adjoining relation so as to extend collectively over an area having lateral dimensions equal to that of the discharge opening of the mouthpiece 2, to be controlled. Associated with such panels 10 is a means, embodied in the tie-rods 20, which engages the opposite and outermost of said panels and is adapted to clamp said panels together exerting a like clamping pressure on the panels intermediate the opposite outermost panels. Such means not only operates to maintain the panels in their specified assembled relation, but also acts to urge the panel edges to mate in flow preventing contiguity. Preferably, the panel clamping means, aforesaid, is of a rigid nature and also engages the intermediate panels in a slidable manner, which allows take-up of spacing between the panels and transmittal of the clamping effect mentioned and resists lateral displacement of said intermediate panels out of the plane determined by the relative position of the outermost panels. Also, said clamping means is adjustable to release the panels from engagement therewith and from the described relation with the remaining panels. Hence, panels may be easily substituted or replaced, if faulty, at minimum cost.

Particularly preferable, the panels 10 are each a hollow and water-tight bulkhead formed of sheet metal and having the shape of a rectangular parallelepiped part of shallow altitude. In the assembly of the parallelepiped parts to form the gate 1, each is positioned so that a base faces upstream and one of its lateral faces of greatest area is in contiguity with a corresponding lateral face of an adjacent parallelepiped part.

Referring again to the drawings, particularly to Figs. 1 and 2 thereof, it will be observed that the panels 10 are truly of parallelepiped form and have sheet metal walls 11, 12 and 13 which define a watertight chamber 14. The walls 11 form opposed bases spaced from each other a short distance to give the parallelepiped a shallow altitude. The walls 12 are opposed lateral faces of greater area than the opposed lateral faces formed by the walls 13. The parallelepiped panels are each disposed so that one base wall 11 faces upstream of the flow through the conduit main 3. Since the pressure of the flow is applied to the base walls 11, there are spaced stay bolts 15, preferably, provided which engage the walls 11 and operate to reinforce the same against diaphragming in response to such pressure.

The tie-rods 20, shown in the drawings as a preferred embodiment of the clamping means aforementioned, each have a head 21 and a threaded shank end 22 upon which a nut 23 may be threaded. Each tie-rod extends through openings 23 formed in the lateral face walls 12 of the arranged panels 10. The tie-rods 20 are rigid against forces applied in shear or tending to bend the shank thereof. When in their installed position, each tie-rod is positioned so that its head 21 engages the outermost lateral face wall 12 of the outermost panel 10 surrounding the opening 24 therein, the shank of the tie-rod extending through the openings 24, the chamber 14 of said outermost panel and through the openings 24 and chambers of the adjacent panel with its threaded end 22 extending outwardly through the opening 24 and beyond the lateral face wall 12 of the opposite and outermost panel 10. The nut 23 is applied to said threaded end and is brought into engagement with the surface surrounding the opening 24 of the last mentioned panel. Hence, the panels 10 are clamped between the head 21 and the nut 23 by the tensioning of the tie-rod 20. As noted, such clamping tension causes adjacent lateral face walls 12 of adjacent panels 10 to be pressed into flow preventing contiguity and the separate panels to be connected, in effect, to form the gate body. The rigidity of the tie-rods 20, thus tensioned, operates to retain the intermediate panels in a common plane determined by the plane of the two outermost and opposite panels. By backing off the nut 23, the tension of the tie-rod may be relaxed and the rod be withdrawn to allow substitution of any panel 10 desired, for the purposes and to the advantage mentioned.

If desired, suitable gaskets 25 may be located between the adjacently disposed lateral face walls 12 to further insure flow resistant mating of the surfaces and to give a resiliency to the clamping tension exerted by the tie-rods. Also, it has been found desirable to locate spacer sleeves 26 about the shanks of the tie-rods, to resist water infiltration to the chambers 14 through such annular openings as may occur between the edges of the openings 24 and the shank surface. The sleeves 26 also provide a bearing for the tie-rods and give added rigidity thereto.

The thus constructed gate is adapted to be moved to seat on a gate frame. The gate frame has the well known mounting angle irons 30 arranged in sash continuity and angular relation to approximate the discharge lip of the mouthpiece 2. The sash formed by the angle irons is anchored to the surface of the mouthpiece, adjacent said discharge lip, so that one leg 31 of angle iron extends inwardly of the lip and the other leg extends across the face of the lip, as shown in Fig. 2 of the accompanying drawings.

The portion of the gate frame against which the gate is adapted to seat embodies the features of my invention. Broadly speaking, the gate seat includes a deformable hydraulic sealing means together with means to adjustably deform the same, as desired, to form a seating surface in the exact surface contour as that of the surfaces of the panel walls 12 adapted to seat thereon. More particularly, I propose to use a strip member of resiliently distortable material which extends in effective continuity about the entire angle iron sash previously described, having header, jamb and sill sections located in substantial registration with the inner surfaces of the mouthpiece 2 and hence perimetric to the flow therethrough. Preferably, the strip has a plane face in proximating relation to the collective surfaces of the upstream base walls 12 of the panels 10. Under the normal conditions of alignment of the panels 10 in a common plane and the proper installation of the gate frame, the plane face of the strip presents a perfect seating surface for the gate 1. However, when the panels or frame become disaligned, warped or bent or installation errors occur, the plane face of the strip will be spaced from mating or seating with the gate surface. Consequently, I utilize the means for adjustably deforming the strip to bulge the said plane face thereof outwardly from the lip of the mouthpiece 2 to produce a seating surface of desired surface contour which compensates for the degree of error or disalignment present. Preferably, such means is embodied in sets of opposed jaws, one jaw of each set being anchored as by welding to the leg 32 of the angle iron sash and the other jaw being movably supported relative thereto. The jaws are located on opposite sides of the longitudinal axis of the strip and when moved toward each other exert a compressing distortion on the strip. Relief from such distortion is found by the strip in bulging outwardly between the jaws which, when controlled by the degree of clamping pressure applied, causes the mentioned plane face to assume a surface contour desired and required to correct the situation of disalignment or error. A particular feature of my construction resides in the jaw moving means which are of a plural nature and spaced along the jaws to give different and graded degrees of movement to the movable jaws and hence effect different degrees of bulging of the strip in zones along its length.

Referring again to the drawings it will be noted that the particular structure selected includes bars or strips 40 disposed upon the leg 32 of the angle iron sash. The strips are preferably rectangular in cross-section, as shown in Fig. 4 of the drawings, and have a plane face 41 which extends outwardly from the lip of the mouthpiece 2. The strips 40 are also preferably formed of extruded or molded rubber and are, therefore, resiliently distortable. The strips 40 extend in effective continuity and angular relation about the angle iron sash and have corresponding header, jamb and sill portions which are retained in such relative position by means of compressing jaws hereinafter described.

The compressing jaws include a plurality of sets of movable jaws 42 and fixed jaws 50. Each set of jaws extends lineally and in parallel relation to a rubber strip 40, one jaw of each set being located on one side of the longitudinal axis of the associated strip and the other jaw located on the other side. The set of jaws may be described as the header, jamb or sill sets according to their respective position relative to the sash.

The fixed jaws 50 of each set are welded, preferably, to the leg 32 of the angle iron sash, as shown in Fig. 4 of the drawings. In effect, the fixed jaw thus becomes an integral water impervious flange extension of the sash iron. Spaced along the length of each fixed jaw 50 and extending therethrough are a plurality of stud bolts 43, each of which provides a bearing for a plurality of spaced and individually operable moving means for the movable jaw 42. The head 44 of each stud bolt 43 is riveted over to lock the bolt to the jaw 50. The shank 45 of each bolt extends toward the strip 40 respectively adjacent thereto and through a hole 46 formed therein to locate its end extending through an opening 49 of a plurality of such openings formed in the jaw 42. A sleeve 47 is disposed about the shank 45 of each bolt. Each sleeve 47 extends through each related hole 46 and opening 49 and is held against axial movement relative to its respective bolt shank by a nut 53 threaded on the end of the shank 45. The diameter of the hole 46 is in excess to the outer diameter of the sleeve 47 to provide an annular space between the sleeve outer surface and the body of the strip 40 into which portions of the strip, in distortion, may expand internally, in a desired limited sense to cause bulging of the face 41 thereof.

The ends 48 of the sleeves 47 form a slide bearing in relation to the openings 49 in each movable jaw 42 by which such jaw is supported for flexible movement relative to its respective fixed jaw 50. The movement of each jaw 42 toward its prospective jaw 50 is effected by a plurality of nuts 51, each of which is threaded on the end 48 of each sleeve 47. The ends 54 of each jaw 42 of the several sets of jaws may be interconnected as by a cap screw 55 which extends through a hole 56 in the end of one jaw and into a tap in the end of the other jaw. The hole 56 is of a larger diameter than the shank of the cap screw 55, thus allowing relative flexible movement of the jaw ends.

In operation, assuming that the gate of the assembly has become warped or bent in use or disaligned during hanging, the installer allows the gate to swing toward the faces 41 of the strips 40. Observing the zones along the strips 40 in which there appears to be an open joint, the installer operates the nuts 53 in such zones to cause the portions of the jaw 42 in such zones to approach the jaw 50. As the jaw portions approach each other, the portion of the strip 40 located therebetween is distorted to bulge the face 41 thereof outwardly from between the jaws into the space in which the undesired open joint exists between the gate and seat. By varying the degree of clamping action exerted by the jaws, the face 41 may be conformed along its length about the sash to provide a gradually increasing or diminishing swelling in the surface 41, as may be desired.

The contour of the surface 41, once being patterned against the gate, will be retained in such configuration until the nuts 53 are again manipulated to relatively move the jaws 42 and 50. Hence, the gate may be swung to and fro relative to its open and closed positions without effect on the seating surface provided by the contoured surface 41.

The seating provision above described is of particular usefulness when used in conjunction with the particular gate of the type described herein. The adaptable nature of the strip face 41 compensates for unevenness of the gate face that may occur as an incident to the separable cellular nature of said gate.

While I have illustrated and described the best forms of my invention now known to me, as required by the statutes, those skilled in the art will readily understand that changes may be made in the disclosed construction without departing from the spirit of my invention as set forth in the appended claims.

I claim:

1. In the combination of a flow control gate and a seating frame therefor, the provision of means on the seating frame and between it and the gate for sealing the two when in a closure relation including a plurality of lineally extending members, each member having at least one substantially plane face and being resiliently distortable in directions tranverse to its longitudinal axis to effect bulging of said plane face; the members extending in a substantially continuous end to end and angular relation to form a sash in which the members are sill, jambs and header respectively; and means engaging each member at separate zones spaced along the members for applying selected compression forces to said members in said zones whereby the members may be selectively distorted to effect desired bulging of said plane face thereof according to the contour of the gate engaging said frame.

2. In the combination of a flow control gate and a seating frame therefor, the provision of means on the seating frame and between it and the gate for sealing the two when in a closure relation and comprising a lineally extending and resiliently distortable member, a plurality of spaced sets of opposed jaws, bearing means individual to each said set of jaws for supporting one of said jaws in a fixed relation of engagement with said member and on one side of the longitudinal axis thereof and for supporting the other of said jaws on the other side of said longitudinal axis and for movement toward and away from the fixed jaw and engagement with the member; and screw operated means individual to each said set for moving the movable jaw relative to the fixed jaw.

3. In combination with a gate-valve seating element, a movable cooperating gate-valve element for a water main comprising a plurality of bulkhead panels in edge to edge adjoining relation and means engaging panel edges opposite the mentioned adjoining panel edges and adapted for clamping adjoining panel edges towards each other into flow preventing contiguity, the provision of a distortable sealing member in a position on one element whereby a surface of the member engages the other element during a portion of a relative movement of the elements toward valve closure and a plurality of independent means on the element on which the member is positioned adapted for engaging the member to distort the member to various degrees of distortion along its extension and subsequently retain the member so distorted whereby the member's mentioned surface, in response to member distortion and prior to element closure, may be caused to assume a contour approximately conforming to the surface contour of the element to be engaged and sealed by the member and so assure a desirable mating fit and hydraulic seal between the elements on valve closure.

4. A flow control gate for a water main characterized by having the combination of a plurality of sheet metal, hollow, watertight and separable rectangular bulkhead panels in edge to edge adjoining relation and extending in a substantially common plane collectively through dimensions at least equal to the cross sectional area of the water main; a gasket element between each pair of adjoining panel edges; and means engaging panel edges opposite the adjoining panel edges and adapted for clamping the adjoining panel edges and the gasket element between the edges toward each other into flow preventing contiguity.

5. In the combination of flow control valve gate and cooperating seat elements, the provision of a strip of rubber, rectangular in cross section, on one element in a position such that one face of the strip contacts the other element in the course of relatively moving the elements to closure; a plurality of pairs of movable jaw parts on the element on which the rubber strip is positioned, each pair of jaw parts spaced from each adjacent pair along the rubber strip, the jaw parts of each pair having clamping surfaces disposed parallel to the axis of flow past the gate and located on opposite sides of the rubber strip, and means individual to each pair of jaw parts in engagement with one jaw part of each pair and adapted for relatively moving and holding the jaw parts together to squeeze the rubber strip and effect bulging of the mentioned face into a desired contour approximating the surface of the element to be engaged by the strip on closure of the gate valve element against the seating element.

6. A sealing means for disposition between the surfaces of valve gate and seating elements adapted to mate on gate closing comprising the combination of a distortable member; a pair of relatively movable jaw-like parts having opposed substantially parallel plane faces adapted for receiving the distortable member therebetween; means in engagement with one of the jaw-like parts adapted for supporting the part on one of the elements; and means independent of the elements and actuatable independently thereof in engagement with the other jaw-like part and adapted, when actuated, for relatively moving the jaw-like parts and, when at rest, for retaining the jaw-like parts relative to positions of desired spacial relation, whereby the distortable member therebetween will be squeezed to a degree producing, in advance of element closing, a bulging of the member into a contour approximating that of that portion of the mating surface of the other element registering with the distortable member when the elements come to a closed position.

7. A sealing means for disposition between the surfaces of valve gate and seating elements comprising the combination described in claim 6 in which the distortable member extends lineally and has at least one plane face which, when the member is undistorted, extends parallel to the member's longitudinal axis and provides a contourable surface adapted for bulging.

8. A sealing means for disposition between the surfaces of valve gate and seating elements comprising the combination described in claim 6 in which the relatively movable jaw-like parts are lineal extended strips disposed on opposite sides of the member's longitudinal axis and plane face and the means actuatable independently of the elements comprises a plurality of bolt and nut sets engaging the strips at spaced points therealong and adapted when drawn up to effect engaging and squeezing of the member whereby the member's plane face is caused to bulge toward the other element and away from the element on which the member is supported.

9. A sealing means for disposition between the surfaces of valve gate and seating elements comprising the combination described in claim 6 in which the means actuatable independently of the elements includes a thing extending through the member and adapted for supporting the member relative to the jaw-like parts independently of squeezing engagement between the member and the parts.

10. A sealing means for valve gate and seating element surfaces adapted to mate on valve closing comprising the combination of a strip of rubber, a strip of metal welded to one element and laterally extending normal with regard to the mating surface of said element, said strip of metal having a plurality of spaced openings therein; a second strip of metal having a like plurality of like spaced openings therein; a plurality of sets of bolts and nuts extending through the strip openings and adapted to support the second named strip of metal laterally normal to the mounting surface of the element to which the first strip is welded, the metal strips connected by the plurality of sets of bolts and nuts providing spaced opposed jaws for receiving the rubber strip therebetween and actuatable independently of the elements and their movements to draw the metal strips together to squeeze the rubber strip into bulging of selected and varying extents along the length of the rubber strip and produce by such bulging a surface contour approximating that of the mating surface of the other element.

11. In the combination of flow control valve gate and cooperating seat elements, the provision of a resiliently distortable member having a lineally extending lateral surface of certain contour, means on one of the elements and in engagement with said member along one of the lineally extending edges of said surface for supporting the distortable member on said one element with said surface in position to engage the other of said elements during relative movement of the elements toward closure; second means in engagement with said member along the other lineally extending edge of said surface parallel to and opposite the first mentioned edge; said second means being mounted for movement relative to said one element toward and away from the first named means; and third means independent of the elements and in engagement with said second means operable independently of the elements and their movement for moving the second means to various positions relative to said first means and for subsequently retaining the same when moved in said various positions, whereby the distortable member between said first and second means is adjustably compressed causing said member surface to be distorted lineally and transversely thereof into various contours different from said certain contour and approximately conforming to that of said other element engaged by said surface thus to assure a hydraulic sealing fit between the elements at each successive closure thereof.

12. In the combination described in claim 11 in which said third means is in engagement with the means for supporting the member on an element and is adapted for cooperating with said the last named means in both supporting and distorting of the member as described.

CHALMERS S. BROWN.

REFERENCES CITED

The following references are of record in the file of this patent:

UNITED STATES PATENTS

| Number | Name | Date |
|---|---|---|
| 996,781 | McCloud | July 4, 1911 |
| 1,334,354 | Dodd | Mar. 23, 1930 |
| 2,166,484 | Carlson | July 18, 1939 |
| 2,341,018 | Clapp | Feb. 8, 1944 |
| 2,375,432 | Miller | May 8, 1945 |

FOREIGN PATENTS

| Number | Country | Date |
|---|---|---|
| 2,986 | Great Britain | of 1875 |